Figure 1:
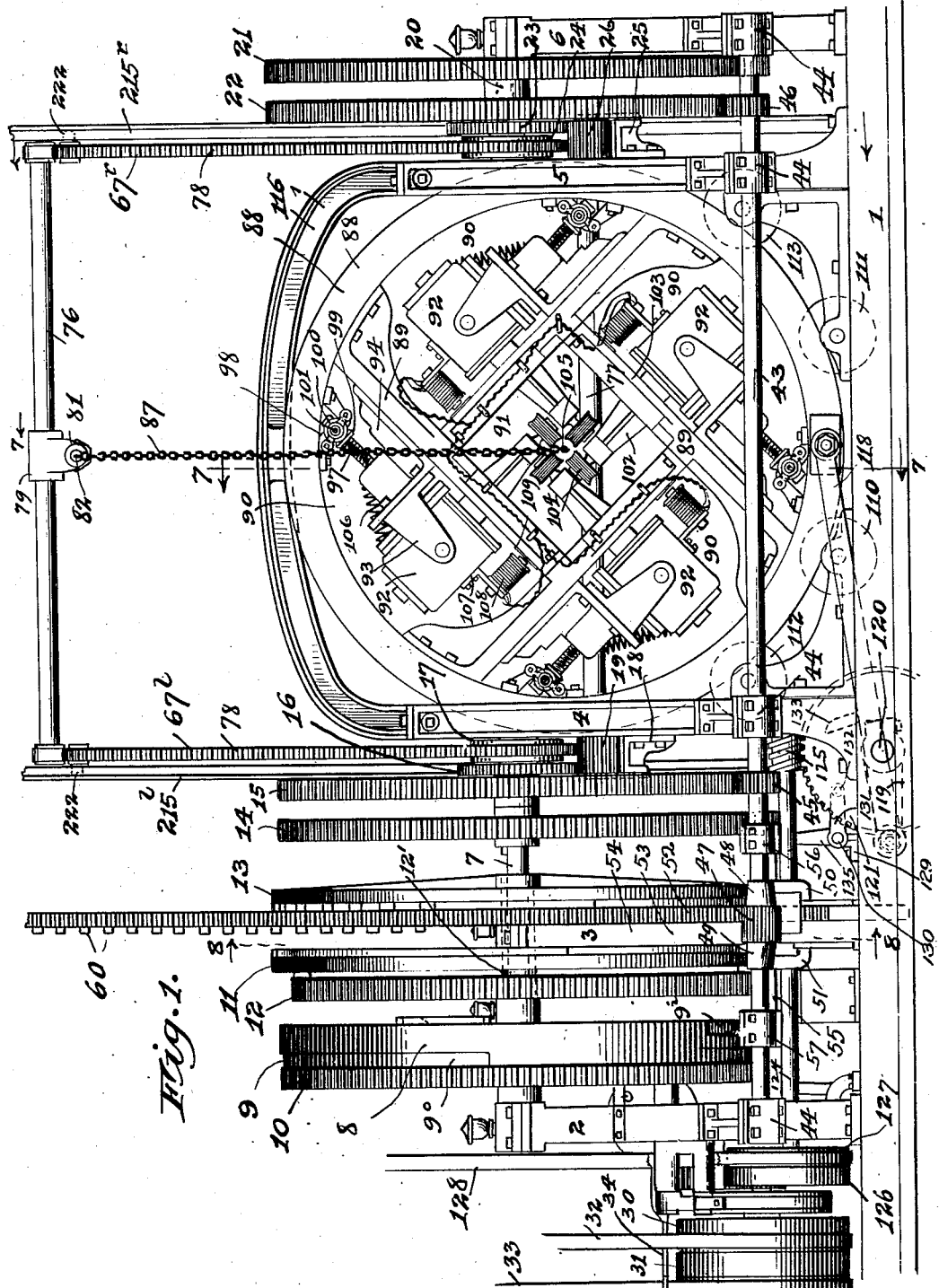

J. F. GAIL.
BUFFING MACHINE.
APPLICATION FILED NOV. 15, 1909.

959,502.

Patented May 31, 1910.
12 SHEETS—SHEET 1.

Witnesses:
F. D. Mann
C. J. Schmidt

Inventor:
John F. Gail
By Offield, Towle, Graves & Offield
Attys.

J. F. GAIL.
BUFFING MACHINE.
APPLICATION FILED NOV. 15, 1909.

959,502.

Patented May 31, 1910.
12 SHEETS—SHEET 2.

J. F. GAIL.
BUFFING MACHINE.
APPLICATION FILED NOV. 15, 1909.

959,502.

Patented May 31, 1910.

12 SHEETS—SHEET 7.

J. F. GAIL.
BUFFING MACHINE.
APPLICATION FILED NOV. 15, 1909.

959,502.

Patented May 31, 1910.
12 SHEETS—SHEET 9.

Witnesses,
L. S. Mann,
C. J. Schmidt.

Inventor,
John F. Gail
By Offield, Towle, Graves & Offield
Attys.

J. F. GAIL.
BUFFING MACHINE.
APPLICATION FILED NOV. 15, 1909.

959,502.

Patented May 31, 1910.
12 SHEETS—SHEET 10.

Witnesses,
S. D. Mann,
C. J. Schmidt

Inventor,
John F. Gail
By Offield, Towle,
Graves & Offield,
Attys.

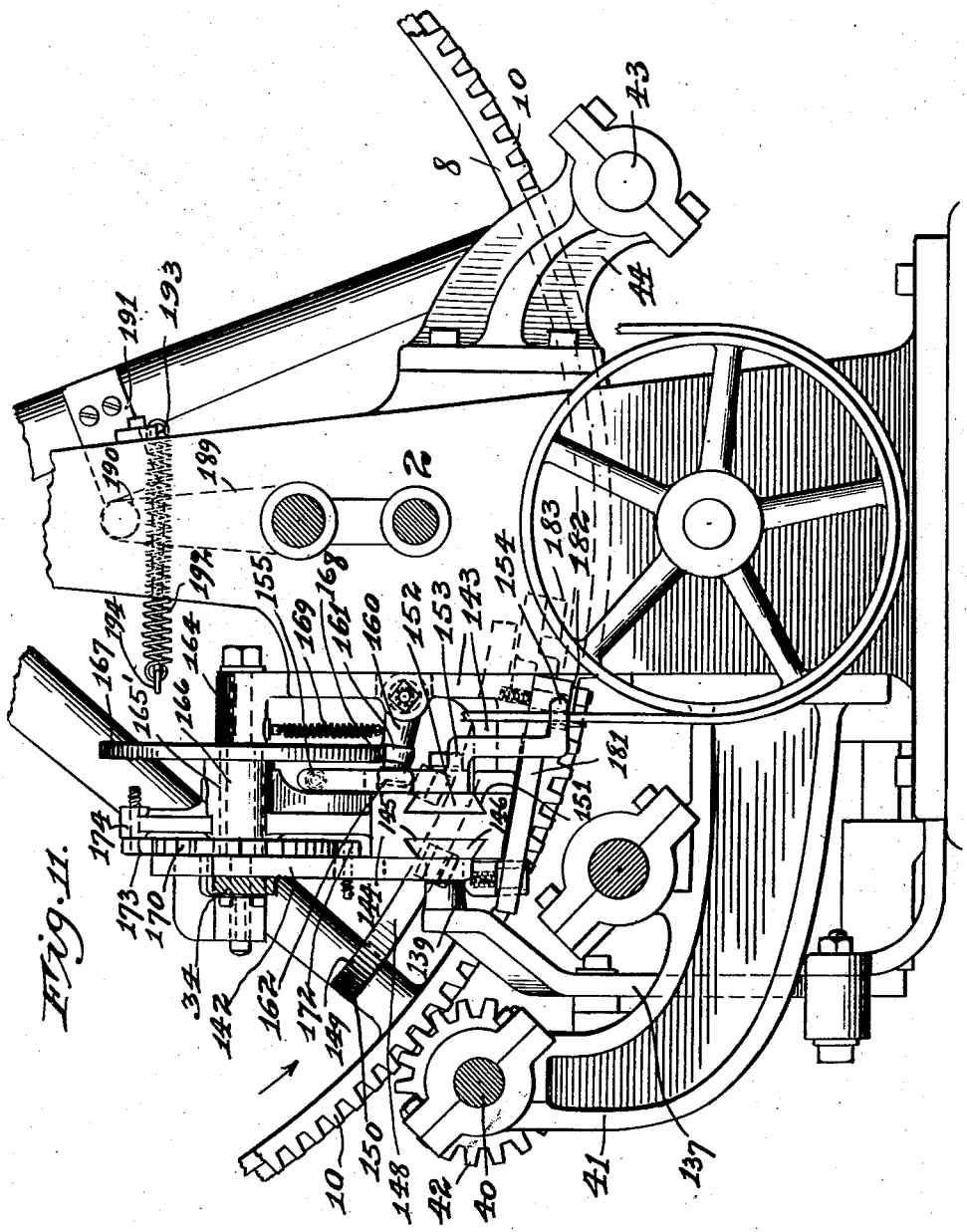

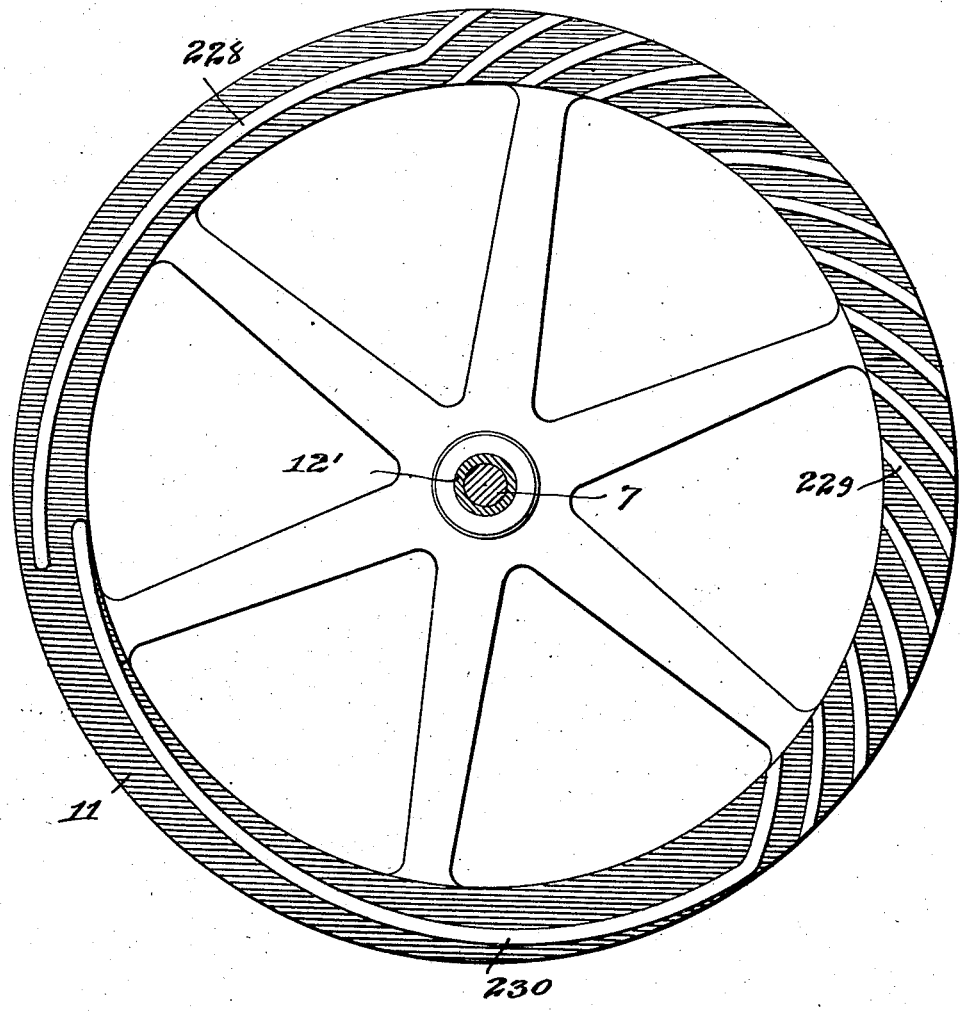

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

BUFFING-MACHINE.

959,502.         Specification of Letters Patent.    Patented May 31, 1910.

Application filed November 15, 1909. Serial No. 528,055.

*To all whom it may concern:*

Be it known that I, JOHN F. GAIL, a resident of Kenosha, in the county of Kenosha and State of Wisconsin, have invented certain new and useful Improvements in Buffing-Machines, of which the following is a full, clear, and precise specification.

My invention relates to buffing machines for buffing objects such as curved or bent rods or tubes, and particularly for buffing long curved parts of bedsteads such as the bow-shaped pieces forming the tops of the head and foot frames of a bedstead.

Among the salient objects of my invention are to provide improved mechanism for bodily carrying an object through a buffing plane or planes and for bodily swinging the object in accordance with its bend or curvature so that uniform application of the buffing members will result; to provide a plurality of buffing wheels acting simultaneously on the object, and improved means for bodily moving the buffing wheels into and out of effective buffing position; to provide improved means for bodily rotating the buffing wheels about the axis of the object; to provide improved electro-magnetically controlled means for effecting the bodily movement of the buffing wheels into and out of effective buffing position and to adapt the electro-magnetic mechanism to operate at predetermined periods during buffing operation; to provide improved timed mechanism for controlling the proper sequence of operation of the various parts of the machine; and in general to provide a well balanced machine which will rapidly and efficiently buff bent objects with little expenditure of power.

In the following specification and accompanying drawings I have shown a machine for carrying out the various features of my invention and particularly adapted for handling and buffing bow-shaped tubular pieces for the head and foot frames of bedsteads.

Figure 2:
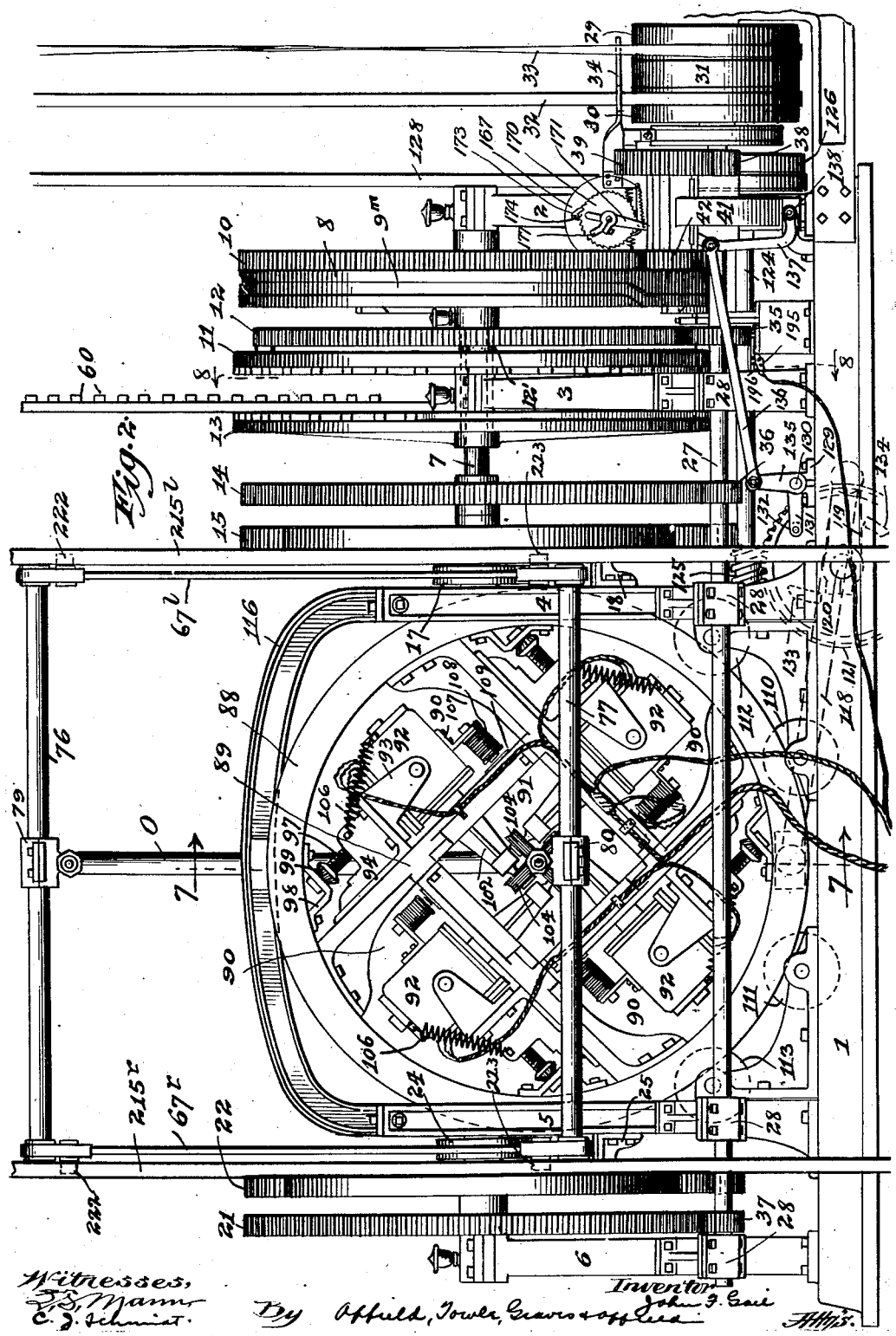
Figure 3:
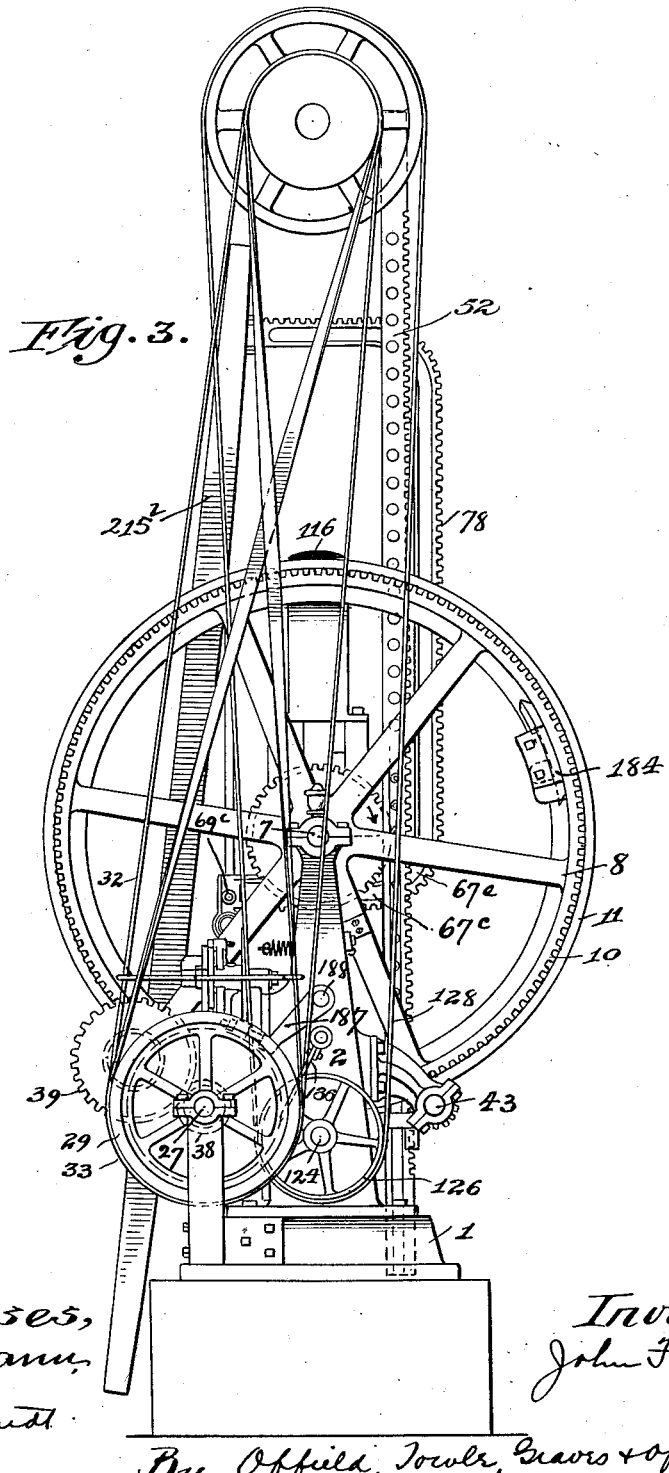
Figure 4:
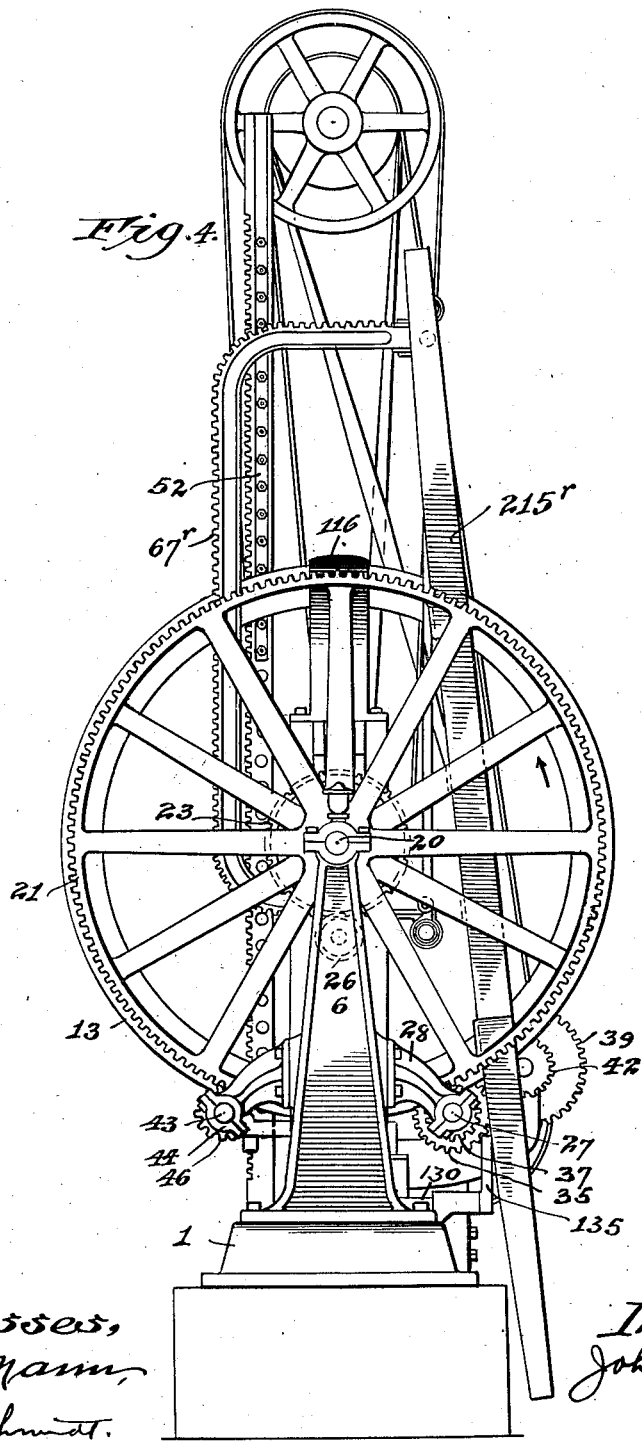
Figure 5:
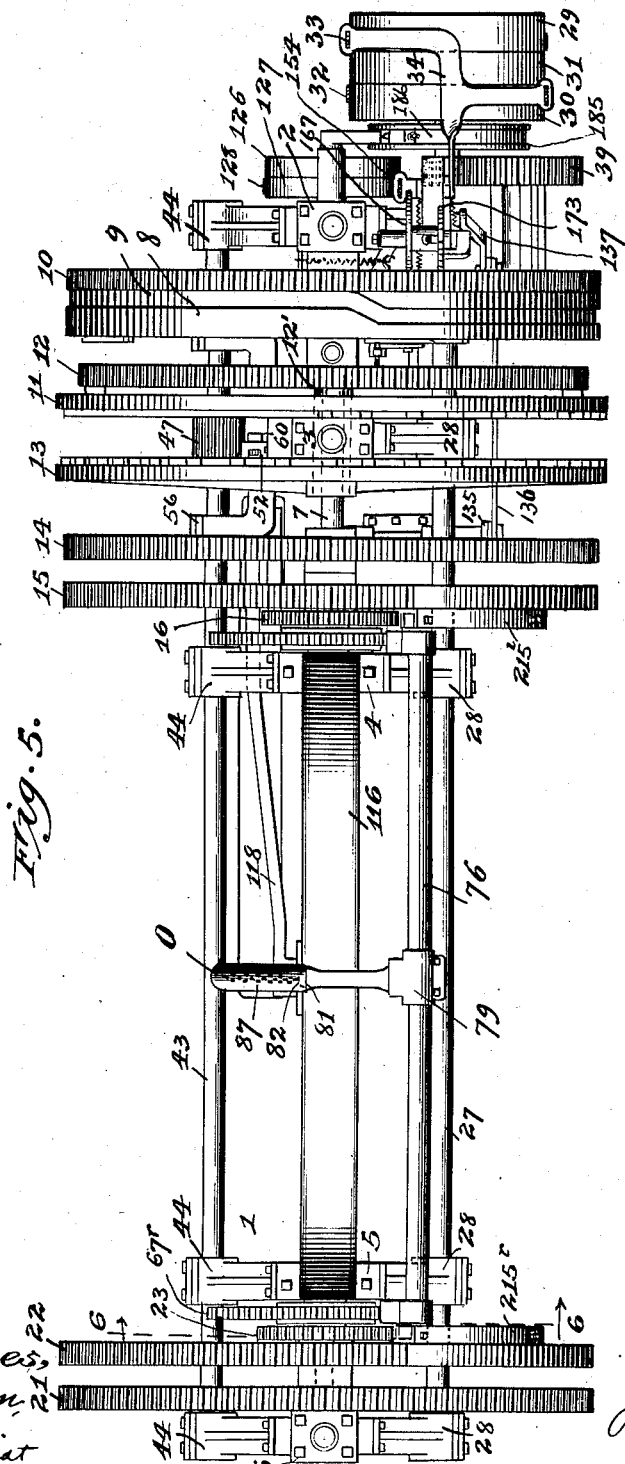
Figure 6:
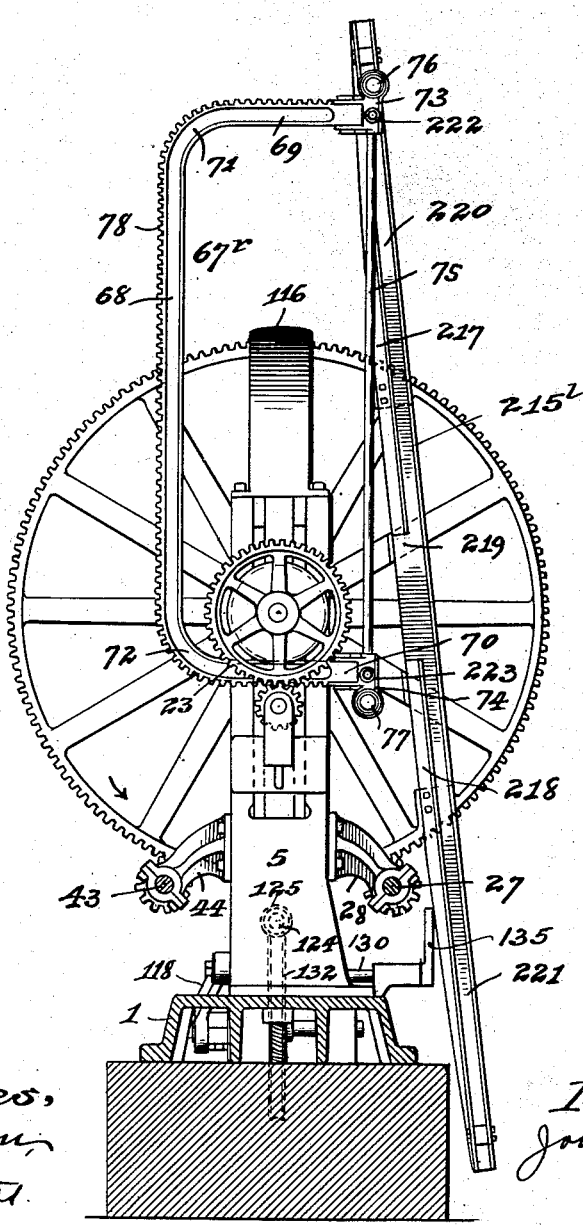
Figure 7:
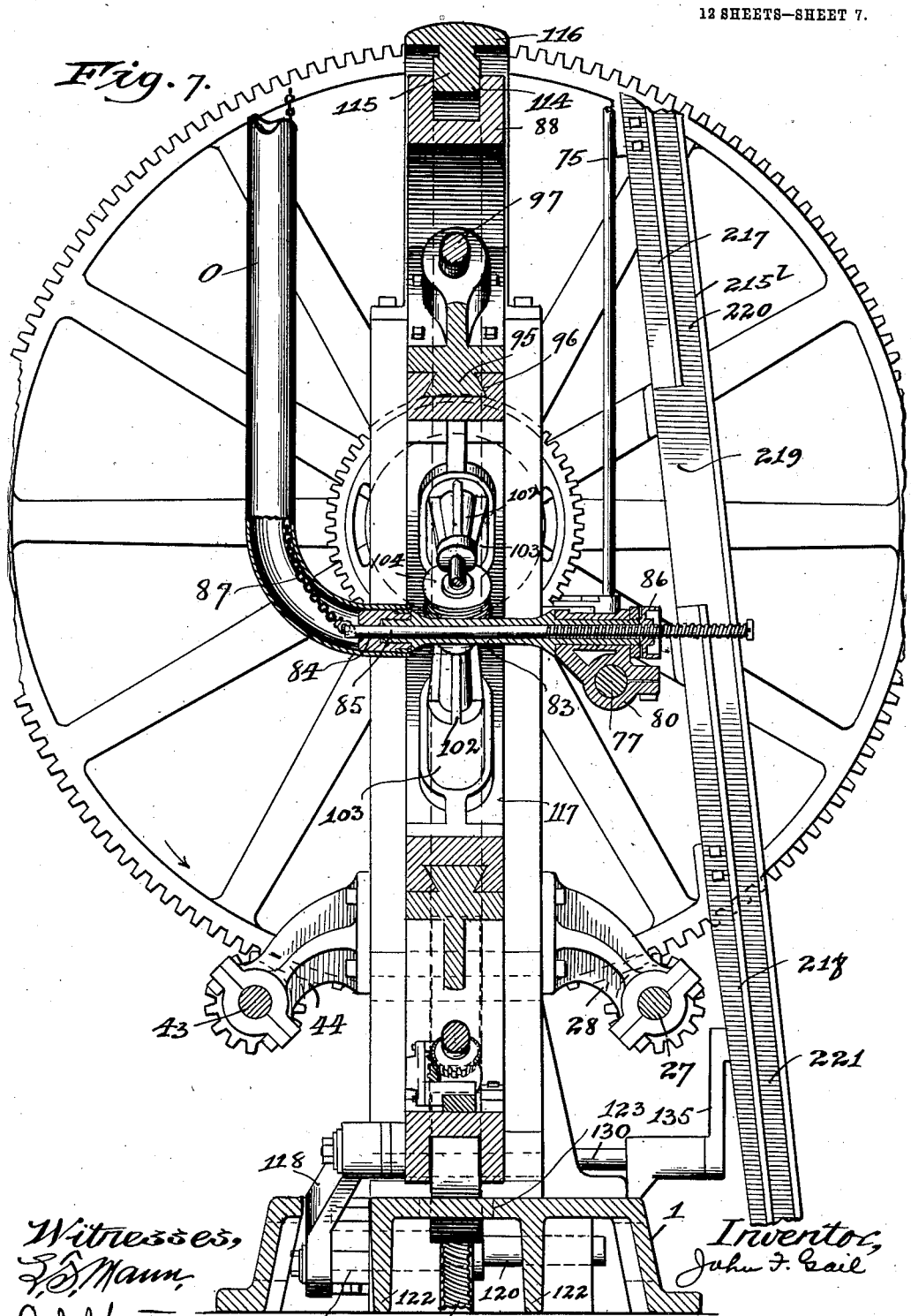
Figure 8:
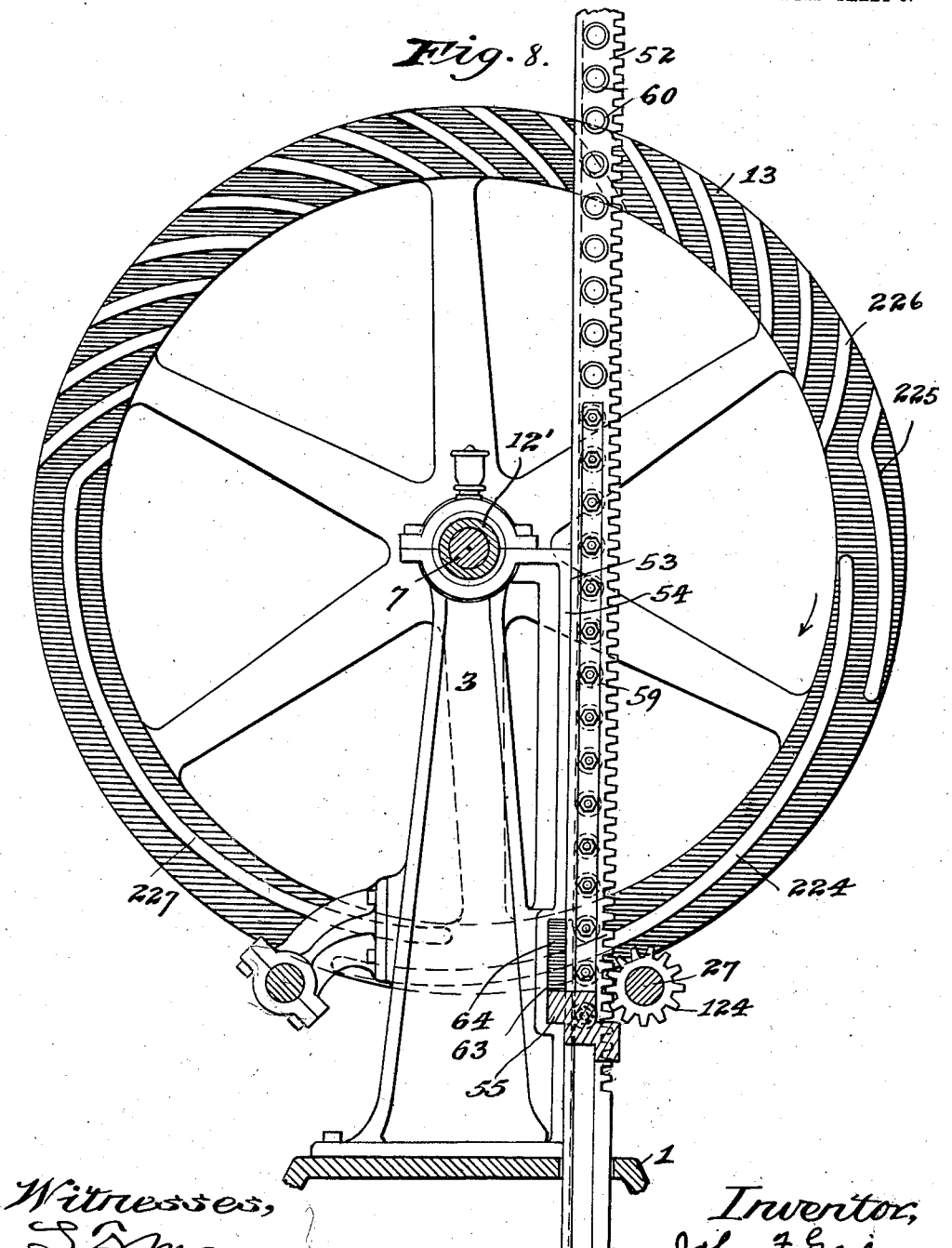
Figure 9:
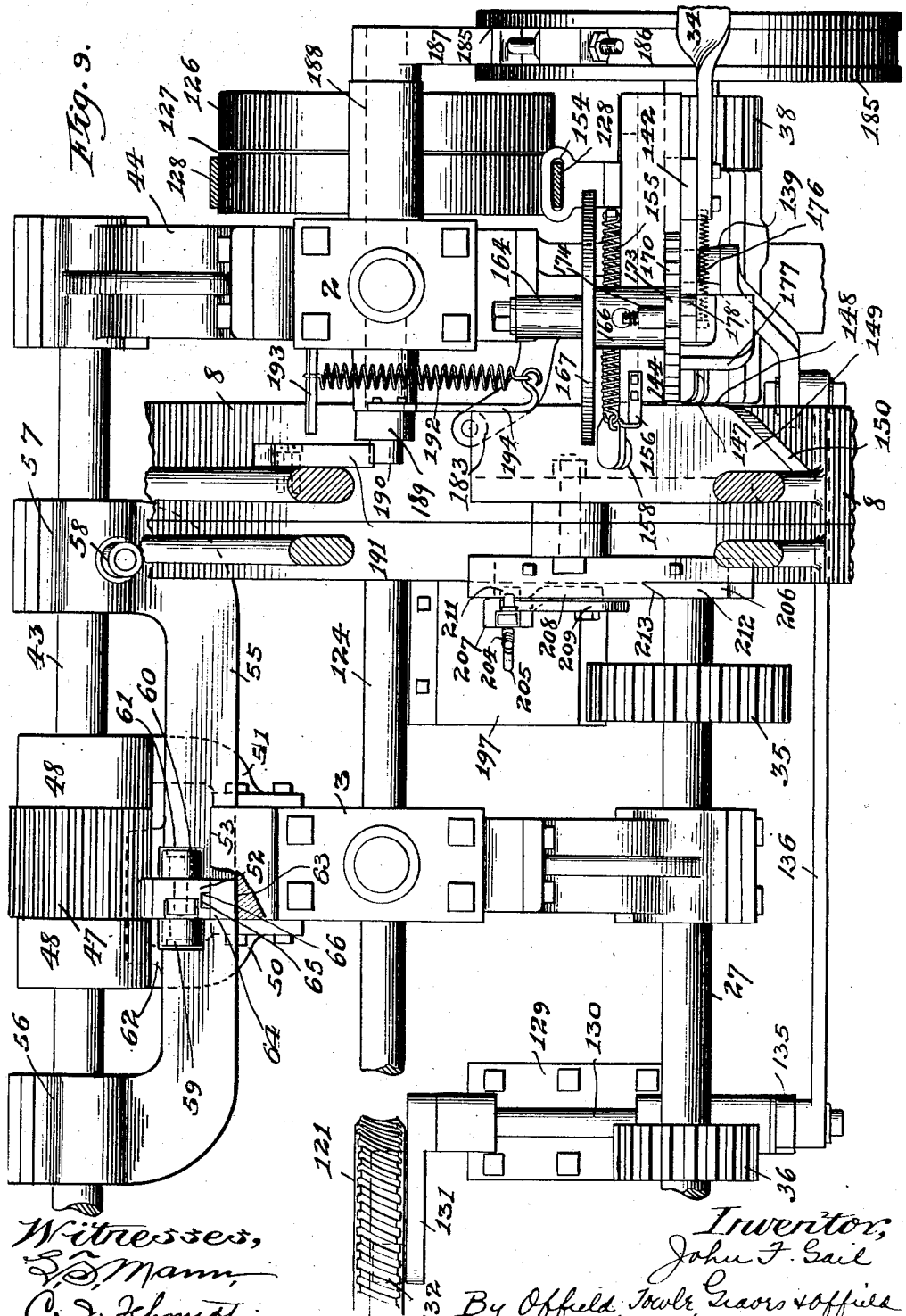
Figure 10:
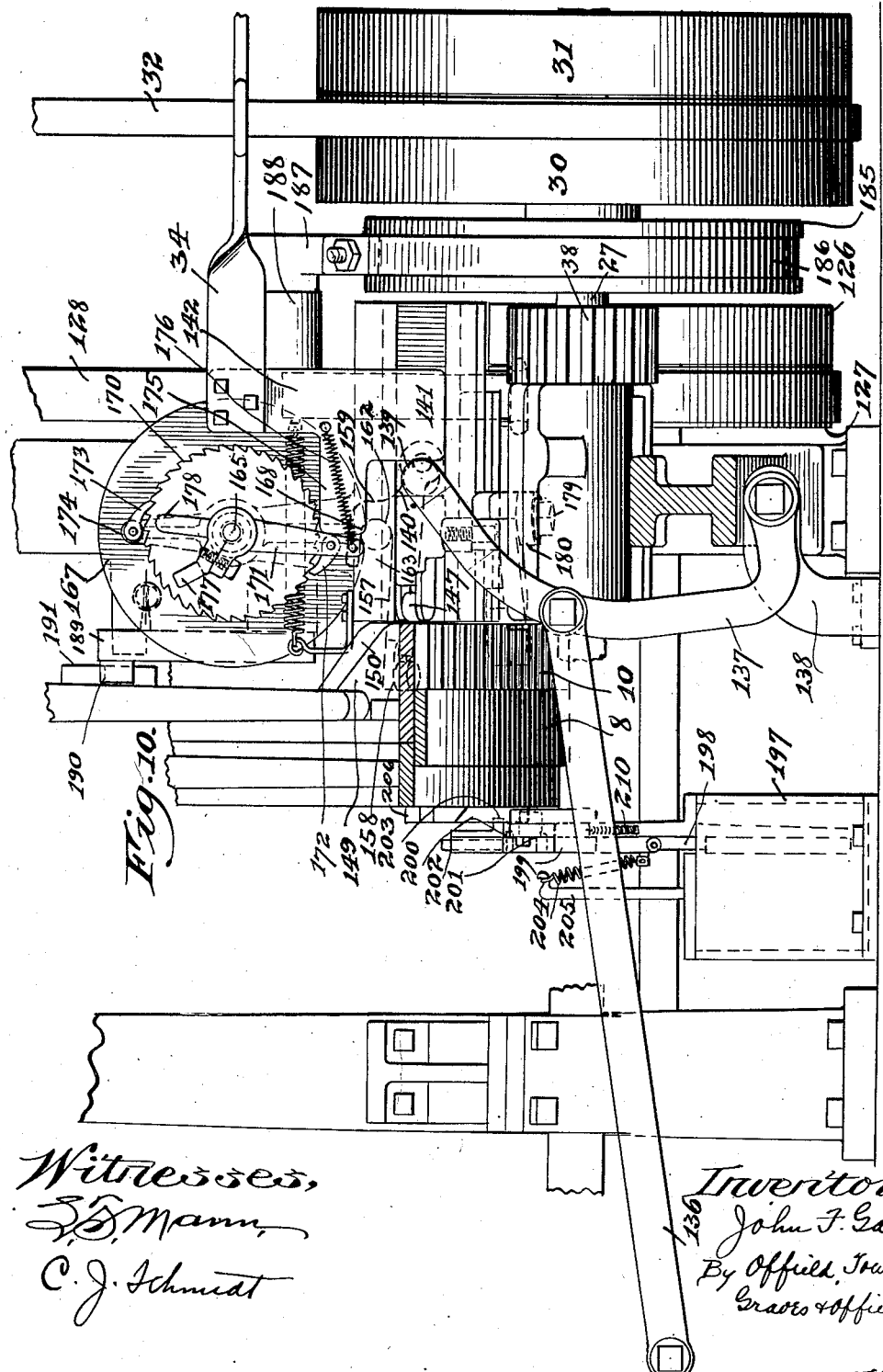

In these drawings Figure 1 is a front view of the machine, Fig. 2 is a rear view, Fig. 3 is an end view taken from the left of the machine, Fig. 4 is an end view taken from the right, Fig. 5 is a plan view of the machine, Fig. 6 is a sectional view taken from plane 6—6, Fig. 5, Fig. 7 is an enlarged sectional view taken on plane 7—7, Figs. 1 and 2, Fig. 8 is an enlarged view taken from plane 8—8, Figs. 1 and 2, showing particularly engagement of rack driving mechanism with a vane cam wheel, Fig. 9 is an enlarged plan view of the left or driving end of the machine showing automatic driving controlling mechanisms and the mechanism for controlling the movement and drive of the rack mechanism, Fig. 10 is an enlarged rear view of the driving end of the machine showing various automatic drive controlling mechanisms, Fig. 11 is an enlarged left end view showing particularly the automatic drive controlling mechanisms, and Fig. 12 is an enlarged side view of a vane cam wheel which coöperates with the vane cam wheel shown in Fig. 8.

Referring to Fig. 1, the bed plate 1 of the machine supports a plurality of standards 2, 3, 4, 5 and 6, disposed in the same vertical plane. Journaled at the tops of the standards 2 and 3 and in standard 4 is a shaft 7 on the left end of which just inside standard 2 is loosely pivoted a large wheel 8 having in its surface a peripheral cam groove 9 and gear teeth 10. Immediately to the left of standard 3 is a vane cam wheel 11 adjacent which is a gear wheel 12, while to the right of standard 3 is a vane cam wheel 13, these three wheels being secured to a bushing 12' receiving shaft 7 and journaled in standard 3. To the right of this vane wheel is a gear wheel 14 keyed to the shaft. To the right of gear wheel 14 is a gear wheel 15 which is loose on the shaft and to the right of this gear wheel is a smaller gear wheel 16 keyed to the shaft, while a grooved guide wheel 17 is loose on shaft 7 between gear wheel 16 and standard 4. Journaled in a bracket 18 extending from standard 4 is a pinion 19 which meshes with gear 16. At the right end of the machine a shaft 20 is journaled in standard 5 and at the upper end of standard 6. Just within standard 6 this shaft has keyed thereto a large gear wheel 21 and between this gear wheel and standard 5 the shaft supports a large gear 22, a small gear 23 and a grooved guide wheel 24, gear wheel 22 and guide wheel 24 being loose on the shaft and the small gear wheel 23 being keyed to the shaft. Journaled in a bracket 25 supported from standard 5 is a pinion 26 which meshes with the small gear 23.

Referring particularly to Figs. 2, 3, 7 and 9, a drive shaft 27 extends along the entire length of the machine at the rear thereof, this shaft being suitably journaled in bearing brackets 28 extending from the various standards 2, 3, 4, 5, 6. At the left end of the machine this shaft supports two idler pulleys 29 and 30 and a drive pulley 31, the idlers being loose on the shaft and the drive pulley being secured thereto. Pulleys 30 and 31 are engaged by forward and reverse belts 32 and 33, these belts passing through a belt shifter frame 34 which is automatically controlled in a manner to be described later. During the position of the belts shown in Fig. 2 the machine is at rest. If the belts are shifted outwardly belt 32 becomes effective to cause forward rotation of the drive shaft and if the belts are shifted inwardly belt 33 causes reverse rotation of the drive shaft. The drive shaft carries pinions 35, 36 and 37 meshing respectively with gears 12, 14 and 21. The main shaft also carries a pinion 38 which meshes with a gear 39 carried on the outer end of a short shaft 40 journaled at the end of a bracket 41 extending rearwardly and upwardly from standard 2 (Fig. 11). The inner end of this shaft carries a pinion 42 which meshes with gear teeth 10 on the large cam wheel 8.

Referring particularly to Figs. 1, 3, 5, 8 and 9, a shaft 43 extends along the front of the machine parallel with shaft 27, being suitably journaled in brackets 44 extending forwardly from the various standards 2—6. This shaft carries pinions 45 and 46 meshing respectively with the gear wheels 15 and 22. Referring particularly to Fig. 9, this shaft also carries a pinion 47 which is keyed thereto and held in position thereon by collars 48 and 49 at the end of brackets 50 and 51 extending forwardly from the standard 3, the pinion meshing with a vertical gear rack 52. The gear rack is of rectangular cross-section and its rear face bears against the front vertical surface 53 of a bearing extension 54 on standard 3 (Figs. 8 and 9). The rack bar is laterally shiftable along surface 53 and its shifting is controlled by a shift bar 55 bridging between bearing frames 56 and 57 receiving shaft 43, bearing frame 57 pivoting a cam roller 58 which coöperates with the large cam wheel 8 already referred to. As shown in Figs. 1, 2 and 5, groove 9 does not extend entirely around the cam wheel and has an inner section 9¹ which extends along an arc less than ninety degrees, a middle section 9ᵐ which extends somewhat less than 180 degrees and an outer section 9° whose length is equal to that of the inner section 9¹. The gear rack 52 journals on one side a row of cam rollers 59 and on its other side a row of cam rollers 60 and the shift bar 55 has a rectangular pocket 61 in its outer edge for accommodating the rack bar and rollers, the rack bar being held against the vertical guide surface 53 by a cap 62 bolted to the bar 55 and also engaging a distance with the sides of the rack bar, as best shown in Fig. 9. The inner edge of the bar 55 passes into a channel 63 formed in extension 54 and this inner edge has an upward rectangular extension 64, the lower face of the rear edge of bar 55 engaging the floor of the channel, and the upper end of the extension 64 engaging the top of the channel so that the bar 55 is locked against vertical movement, being, however, free to move longitudinally through the channel. The front face of the extension 64 is flush with the surface 53 engaged by the rear face of the rack bar, and along the front face of the extension 64 extends vertically a tooth or key 65 which engages in the keyway 66 cut in the rear face of the rack bar. The key serves to retain the rack bar in vertical alinement and together with the cap 62 serves to connect the rack with the shift bar 55 so that as the shift bar 55 moves along shaft 43 the rack bar will move laterally along the guide surface 53. When the cam roller is in the inner section 9¹ of groove 9 the shift bar 55 will be in its inner position and the rack bar will be in its inner position in coöperation with the vane cam wheel 13, as shown in Figs. 1 and 2. When the cam roller is in the middle slot section the rack bar will be shifted to an intermediate position and when the cam roller is in the outer slot section 9° the rack bar will be in its outer position in coöperation with vane cam wheel 11. The coöperation of the rack bar with the vane cam wheels will be described in detail later.

The mechanism for supporting the object to be buffed is best shown in Figs. 1, 2, 3, 4, 5, 6, and 7. This mechanism is in the form of a frame whose principal parts are the members 67¹ and 67ʳ which have the same longitudinal bend and curvature as the object to be buffed. In this case the members are constructed as best shown in Fig. 6, each having a middle straight section 68 whose ends 69 and 70 extend at right angles therefrom, the bends 71 and 72 having the same radius of curvature as those of the object, one end of the object to be buffed being plainly shown in Fig. 7. The ends 69 and 70 terminate in cap pieces 73 and 74 connected together by a stiffening rod 75. The caps 73 of the members are connected together by a cross-bar 76, and the opposite caps 74 are connected together by a cross-bar 77. The left and right side members 67¹ and 67ʳ are therefore connected together to form a rigid frame. The side members 67¹ and 67ʳ are provided with gear teeth 78 which extend along the entire outer side of the parts 68, 69, 70, 71 and 72, as shown, and when the supporting frame is applied to the machine the teeth of the left and right side members mesh with pinions 19 and 26 respectively, such meshing relation being maintained by the grooved rollers 17 and 24 respectively whose grooves receive the inner sides of the side member parts above mentioned, the curvature of the grooved rollers corresponding with that of the bends 71 and 72. Therefore, upon rotation of the pinions the supporting frame will be carried through the machine and will be swung in accordance with the curvature of the side members so that the supported object will be carried longitudinally through a buffing field. The pinions are driven upon rotation of gears 16 and 23 which are secured to shafts 7 and 20 respectively, whose rotation is controlled by pinions 36 and 37 on main driving shaft 27.

At the centers of cross-bars 76 and 77 are clamped suitable supporting frames 79 and 80. The construction of frame 79 is best shown in Figs. 1 and 5, the frame being adapted for adjustable clamping on the cross-bar 76 and having a forwardly extending arm terminating in a shoulder 81 and plug 82, the upper end of the object O to be buffed engaging against the shoulder 81 and being held in place thereon by the plug 82. The construction of the lower supporting frame 80 is best shown in Fig. 7, this frame being adapted for adjustable clamping engagement with the cross-bar 77 and having an arm 83 terminating in a head 84 for receiving the other end of the object O. The arm 83 is hollow and journals a rod 85 whose outer end is threaded and engaged by a nut 86 which nut bears against the outer end of frame 80, so that upon turning of the nut rod 85 will be moved longitudinally in the arm 83. A chain 87 is secured at one end to the center of plug 82 and the other end of the chain is adapted to be hooked to the inner end of rod 85. When the object O is to be applied to the supporting frame the chain is slipped therethrough and the ends of the object applied to the shoulder 81 and head 84 respectively, whereupon nut 86 is turned to draw out the rod 85 to thus apply tension to the chain, the result being that the object is securely rigidly held to the parts receiving its ends. When the object is thus secured to the frame it will be parallel to the sections 68 to 72 of the side frames 67¹ and 67ʳ and when these side frames are swung and carried through the machine the object is carried through the field of the buffing mechanism. This buffing mechanism is best shown in Figs. 1, 2 and 7. In general, a plurality of buffing wheels are individually driven by electric motors, the buffing wheels being arranged adjacent each other to form a buffing aperture or field through which the object to be buffed is carried by its supporting frame. The motors are carried in a frame comprising a rim 88 having a plurality of ribs 89 secured to the inner face of the rim and extending along chordal planes. As shown, there are four such ribs bolted to the inner face of the rim and extending toward each other and secured to each other to form four compartments 90 and a rectangular central compartment 91. Each compartment 90 accommodates an electric motor 92 whose frame is trunnioned at the ends of arms 93 extending from a bracket 94 on the rib 89 forming the floor of the compartment. Each bracket has a dove-tail tongue 95 engaging in a dove-tail slot 96 of its supporting rib. An adjusting screw 97 threads into each bracket, its outer end being pivoted in a frame 98 secured to the inner face of the rim. Each screw carries a bevel pinion 99 meshing with a pinion 100 mounted on shaft 101 journaled in frame 98, the front end of the shaft being squared so that a tool can be applied to rotate pinion 100 and thereby screw 97 to cause longitudinal adjustment of the bracket along its supporting rib and longitudinal bodily adjustment of the motor frame. Each motor frame has an elongated bearing 102 for its armature shaft, the elongated bearings extending through openings 103 in the rib parts forming the central compartment 91. The elongated bearings extend into compartment 91 so that buffing wheels 104 carried at the ends of the armature shafts will be adjacent to form an aperture or field 105 through which the object is moved. The outer end of each motor frame is connected by a spring 106 with its supporting bracket, the tendency of the springs being to swing the motor frames to carry the buffing wheels toward each other and against the object passing through the buffing field. Each motor frame also carries a bracket 107 supporting electro-magnets 108 which when energized are bodily attracted toward the iron frame work or toward an armature 109 secured to the frame work, such attraction of the electro-magnets causing rotation of the motor frames to swing or spread apart the buffing wheels. As will be shown later, electric circuits for these electro-magnets are controlled automatically at the proper time to energize the electro-magnets to cause swinging apart of the buffing wheels when the ends of the object to be buffed are reached, so that the frame work supporting the object will not come in contact with the buffing wheels. In order that more uniform buffing will result the buffing wheels should be shifted so as to engage different longitudinal areas of the object. For this purpose I provide mechanism for rotating the rim 88 about its axis through an angle which will carry the buffing wheels into different planes. To this end the rim 88 is rotationally mounted on rollers 110, 111 journaled on the machine bed, and side rollers 112, 113 suitably journaled in standards 4 and 5. The rim has the outer peripheral groove 114 in which these rollers engage, the rim being further guided and held in alinement by a tongue 115 extending downwardly into groove 114 from a bridge piece 116 connecting the upper ends of standards 4 and 5. As best shown in Fig. 7, the rim also extends into channels 117 formed in standards 4 and 5, and thus the rim is securely locked in vertical alinement but adapted to rotate freely about its axis.

The mechanism for rotating the rim is best shown in Figs. 1, 2, 3, 7, 9 and 10. One end of the connecting rod 118 is pivoted to the lower part of the rim, its other end being pivoted to a crank arm 119 secured to shaft 120 carrying a worm wheel 121. This shaft is journaled in ribs 122 formed on the bed frame, the worm wheel projecting upwardly through a slot 123 in the bed frame top. A shaft 124 journaled in standards 2, 3 and 4 carries at its inner end a worm 125 meshing with worm wheel 121 and at its outer end carries drive and idler pulleys 126 and 127 respectively, with which driving belt 128 coöperates. Journaled in a bearing frame 129 secured to the bed plate is a shaft 130 extending at right angles with the worm shaft. The inner end of this shaft carries an arm 131 pivoting at its end a cam roller 132 which coöperates with diagonally opposite cam blocks 133, 134 extending from the side of the worm wheel. The other end of shaft 130 carries an arm 135 set at an angle with arm 131, the end of this arm 135 pivoting to the inner end of a connecting rod 136 whose other end pivots to an intermediate point of a lever 137 pivoted at its lower end to the bed plate at 138 and its upper end carrying a cam projection 139 which engages in the vertical slot 140 of a slider frame 141 which has an upward extension 142 from the end of which extends the belt shifting bar 34 already referred to. Referring particularly to Figs. 9, 10 and 11, a bracket 143 extends rearwardly from the standard 2 and at its end forms a slide frame 144 having in its rear face the horizontal slide groove 145 for receiving the dove-tail tongue 146 on the slider frame 141 already referred to. Pivoted to the inner end of this slider frame is a cam roller 147 which coöperates with the outer edge 148 of the cam plate 149 secured to the inner face of the rim of the large cam wheel 8, the approaching surface 150 for this cam plate being at the left end thereof (Fig. 11) so that the cam roller is carried into engagement with the edge 148 when the large cam wheel rotates in clockwise direction. The adjustment is such that when the cam roller is in engagement with the edge 148 the main driving belts 32 and 33 will be in engagement with the idle pulleys (Figs. 1 and 2), the machine being then at rest.

In the front face of the slide block 144 is a slide groove 151 for receiving a slide bar 152. Secured to the outer end of this slide bar is a vertical belt shifting piece 125 whose lower end has the opening 154 for receiving the worm shaft driving belt 128 and whose upper end is connected by a spring 155 with a bracket 156 secured to the inner end of the slide frame 144 (Fig. 9). Pivoted at its outer end to the slide bar 152 just inside the belt shifting piece 153 is a bar 157 whose inner end pivots a cam roller 158 adapted for coöperating with the front edge 148 of the cam plate 149 already referred to. An arm 159 extends upwardly from the bar 157 and bends inwardly to run parallel for a distance with the top of the bar. Pivoted to the rear side of the standard 2 is an arm 160 pivoting at its end two rollers 161 and 162 respectively, the outer roller 162 engaging in the slot 163 formed between the arm 159 and the bar 157. The upper end of the bracket 143 terminates in a bearing sleeve 164 which secures one end of a rod 165 passing through a bearing frame 166 carried on slide frame 144. Between the sleeve 164 and the bearing frame 166 is a disk 167 secured to one end of a sleeve 165' journaled in the bearing frame 166 about the rod 165. The disk has a notch 168 for coöperating with the inner cam roller 161 on arm 160, a spring 169 connecting between the arm 160 and sleeve 164 serving to hold the roller against the periphery of the disk. When the roller 161 engages in the notch, arm 160 will be raised by the spring and bar 157 raised accordingly to lift cam roller 158 out of the plane of the cam plate 149, but when the roller leaves the notch, arm 160 and bar 157 will be held down to retain the cam roller in the path of the cam plate. The disk 167 is intermittently controlled by pawl and ratchet mechanism comprising a ratchet wheel 170 secured to the other end of sleeve 164, and a pawl arm 171 pivoted on rod 165 and carrying a pawl 172 for coöperating with the teeth of the ratchet wheel, a detent pawl 173 being also provided and pivoted to standard 174 on bearing frame 166. The slide frame 141 has a lateral extension 175 whose end is in the plane of the arm 171, a spring 176 connecting between the end of arm 171 and the frame 141 tending to hold the arm against the extension 175 so that as the frame 141 is reciprocated laterally arm 171 will be swung to associate pawl 172 with the ratchet wheel. When frame 141 moves outwardly the pawl is carried idly over a number of teeth and when frame 141 is moved inwardly the pawl will cause rotation of the ratchet wheel, detent pawl 173 serving to lock the ratchet wheel against return movement. Angular advance of the ratchet wheel can be controlled by an abutment 177 adjustably clamped to the end of rod 165 to coöperate with an arm 178 extending upwardly from the hub of arm 171. The ratchet wheel and notch disk will, therefore, be given an angular advance for each reciprocation of the slide frame 141, and depending upon the adjustment of the abutment 177 the notch disk will rotate one complete revolution for a predetermined number of reciprocations of the belt shifting slider frame 141, and therefore, the cam roller 158 is dropped into operative position and the worm shaft controlling belt shifted to the working pulley once for each period of reciprocations of the main belt shifting mechanism.

The mechanism already referred to which associates the lever 137 with the worm wheel cam blocks controls the outward shifting of the frame 141 to carry the forward driving belt into engagement with the driving pulley 31, while the cam roller 147 coöperating with the cam plate 149, controls the shifting of the belts to the idle pulleys to stop the machine. The mechanism for shifting the belts from the forward driving direction to the reverse driving direction is best shown in Figs. 9, 10 and 11. The frame 141 has a depending pivot extension 179 carrying a cam roller 180 which is engaged by a lever 181 pivoted at an intermediate point to an extension 182 on standard 2, the inner end of the lever extending within the rim of the large cam wheel 8 and pivoting a cam roller 183. This cam roller coöperates with a cam block 184 carried by the cam wheel 8 and is engaged thereby at the proper time to cause lever 181 to be swung to shift slider frame 141 from its outer to its inner position to carry the belts from the forward driving position to a reverse driving position.

The main driving shaft 43 at a point between the standard 2 and the driving pulleys carries a brake wheel 185 encircled by a brake strap 186 whose one end is secured to the standard 2 (Fig. 3) and whose other end connects to the end of an arm 187 extending from a shaft 188 journaled in standard 2 and terminating at its inner end in an arm 189 carrying a cam roller 190 for coöperating with an abutment block 191 carried by a spoke of the large cam wheel 8. The adjustment is such that at the proper time the cam roller will be engaged by the abutment and the brake strap bound about the brake wheel to cause sudden stopping of the machine. A spring 192 connecting between a pin 193 on standard 2 and an arm 194 extending from the crank arm 189 serves to loosen the brake strap upon disengagement of the cam roller 190 from the abutment 191.

The electrical contact mechanism for controlling the circuits of the electro-magnets 108 is best shown in Figs. 9 and 10. The electro-magnets are all connected in bridge of conductors 195 and 196 (Fig. 2) which conductors lead to the terminals of a quick brake oil switch 197. The switch mechanism may be of any construction. As shown, switch bar 198 for controlling the switch terminals has pivoted to its outer end an upwardly extending arm 199 which has two laterally extending teeth 200 and 201 and whose upper end carries a sleeve 202 having laterally extending tooth 203. A spring 204 connecting between the lower end of the arm and stationary post 205 tends to hold the switch bar 198 upwardly away from the circuit switch terminals and to swing the arm 199 toward the cam plate 206 secured to the rim of the wheel 8 on the inner face thereof and overhanging the inner edge thereof. A post 207 extending upwardly from the oil switch structure 197 serves to guide the upper end of arm 199 and has a rearwardly extending arm 208 pivoting at its end a lever 209 whose front end is normally held between teeth 200 and 201 by force of spring 204 and whose other end is connected by a spring 210 with the post 207, this spring tending to raise the front end of lever 209 and to raise the arm 199 and switch bar 198 to close the electro-magnet circuit. Pivoted to the front end of lever 209 and extending toward the cam plate 206 is a cam roller 211 which normally engages the under side of the cam plate 206 to hold lever 209 and the switch bar 198 down to close the electro-magnet circuit. At its rear end the cam plate 206 has a radial projection 212 having a beveled inner end 213. Normally roller 211 engages the under side of the cam plate 206 and tooth 203 extends inwardly over the edge of the cam plate. When the large cam wheel 8 rotates the beveled end 213 engages tooth 203, thereby causing arm 199 to swing away from the cam plate thereby withdrawing tooth 201 from under the lever 209, the result being that spring 204 is free to throw up arm 199 and switch bar 198 to thereby open the electro-magnet circuit. The lever 209, however, will not swing upwardly until its roller 211 leaves the rear end of cam plate 206. When the lever 209 swings upwardly it will again come into latching engagement with the arm 199 upon entry between teeth 200 and 201. When the direction of rotation of the cam wheel 8 is then reversed the front beveled end of the cam plate 206 will receive the roller 211 to again deflect lever 209 downwardly to restore arm 199 to its lower position and to return bar 198 to re-close the electro-magnet circuit. The switch bar 198 and the circuit terminals are immersed in oil in the structure 197 and this together with the spring actuation of the switch bar 198 will prevent sparking and will cause efficient opening and closure of the electro-magnet circuit.

The vane cam wheels for controlling the operation of the rack bar 52 are best shown in Figs. 8 and 12. As has already been mentioned, the rack bar which coöperates with these wheels has two sets of rollers 59 and 60, the rollers 59 extending along the lower half and from one side of the bar, and the rollers 60 extending along the upper half and from the other side of the bar, the two rows of rollers, however, over-lapping about three rollers. Rollers 59 coöperate with the vane cam wheel 13 when the rack bar is moved to its innermost position, as shown in Fig. 9, and cam rollers 60 coöperate with the vane cam wheel 11 when the rack bar is moved to its outermost position, the rack bar being disengaged from both vane wheels when shifted to its intermediate position. The purpose of the rack bar and its driving cam wheels is to control carrier mechanism for assisting in the proper transmission of objects through the buffing field. If the object were comparatively short and light the gears 16 and 23 together with pinions 19 and 26 and the grooved rollers 17 and 24 would be able to carry the object-supporting frame through the machine, but where the object is comparatively long and heavy, the strain would be too severe on these parts and therefore additional supporting means controlled by the rack bar and vane wheel mechanism is provided. This additional supporting mechanism is best shown in Figs. 3, 4, 6 and 7. The large gear wheels 15 and 22 already referred to at the beginning of the specification carry respectively beams 215¹ and 215ʳ, these beams being parallel and bolted to their respective gear wheels along chords of these wheels so that rotation of the wheels will swing the beams about the shafts 7 and 20. As best shown in Figs. 6 and 7, each beam is in the form of an angle-bar to whose ends are secured angle-bars 217, 218 respectively, whose inner ends do not meet but which leave a gap 219. The webs of the angle bars form cam grooves 220 and 221 at the ends of each beam, which grooves coöperate with cam rollers 222 and 223 extending from the cap members 73 and 74 of the object-supporting frame. Referring to Figs. 4, 6 and 7, cam rollers 222 on the upper caps 73 of the supporting frame engage respectively in the upper ends of cam grooves 220 of beams 215¹ and 215ʳ respectively, the lower cam rollers 223 being outside of the lower grooves 221. In this position the sections 68 of the side members 67¹ and 67ʳ are vertical and the bends 71 and 72 are away from the pinions 19 and 26, the object, as best shown in Fig. 7, having just been inserted and ready to enter the buffing field. The supporting frame must now be moved to the right (Figs. 4, 6 and 7) parallelly to bring the bends 72 into engagement with the guide rollers 17 and 24. During this movement of the supporting frame the beams must be swung to vertical position so that the lower cam rollers 223 can come into position before the lower cam grooves 221 of the beams. As the pinions 19 and 26 now engage the teeth on the bends 72 the beams should be swung toward horizontal position to rigidly balance and to synchronously carry around the upper end of the supporting frame, the lower cam rollers 223 during this movement passing into the lower grooves 221. When the beams reach a horizontal position the sections 68 which are now horizontally disposed will be ready to travel through the machine to carry the corresponding part of the object through the buffing field and during this movement rollers 222 and 223 move horizontally through the cam grooves 220, 221 until the bends 71 reach guide rollers 17 and 24 whereupon the beams should again be rotated to lift the free end of the supporting frame back into vertical position at the other side of the machine. At the end of this movement the beams and the sections 68 are vertical and thereafter the supporting frame must travel parellelly to carry the bends 71 away from the guide rollers and to carry the corresponding end of the object through and from the buffing field. At the end of this lateral movement of the frame, rollers 223 will have reached the outer ends of cam grooves 221 of the beams while rollers 222 will have reached the gaps 219 and will have left the beams, the supporting frame being vertical but the beams being slightly tilted. The supporting frame is now carried in reverse direction through the machine to its normal position and the various positions and movements described will take place in reverse order until the parts again assume the starting positions shown in Figs. 4, 6 and 7. It is for controlling these various movements of the beams that the vane wheels and rack mechanism driven thereby are utilized.

Referring to Fig. 8, the side face of the rim of vane wheel 13 has a plurality of cam vanes for coöperating with the rollers 59 on the rack bar to raise and lower the rack bar. These vanes comprise a long vane 224 approaching from the outer to the inner edge of the rim, a shorter vane 225 approaching from the outer toward the inner edge of the rim, a plurality of short vanes 226 extending between the rim edges, and a final long vane 227 extending along a radial curve for the greater part of its distance to give no movement of the rack bar. When the cam wheel 13 rotates in clockwise direction from the position shown in Fig. 8, vanes 224 and 225 coöperate with rollers 59 to gradually raise the rack bar a short distance and the shorter vanes 226 then coöperate with the rollers to move the rack bar downwardly, and during engagement of the vane 227 the bar remains stationary. The first upward movement of the rack is accompanied by the movement of the beams from an inclined position (Figs. 4, 6 and 7) to a vertical position and the prolonged downward movement of the rack bar is accompanied by the swinging of the supporting frame about the bends 72 while during the period covered by the vane 227 the rack bar is stationary and the pinions 19 and 26 are working on the sections 68 of the supporting frame to carry the corresponding part of the object through the buffing field.

The vane cam wheel 11 is shown on Fig. 12. This wheel on its side facing the wheel 13 has a long vane 228 whose outer end deflects outwardly slightly and whose inner section extends along an arc centered in the wheel axis. This vane leads to a series of short vanes 229 from the end of which series a long vane 230 leads to the beginning of vane 228 and deflects inward gradually. Vane 228 guides the rollers 60 to the short vanes 229 which cause upward travel of the rack bar and swing of the beams to carry bends 71 through the machine, while vane 230 assists in raising the rack bar to allow inward swing of the upper ends of the beams while the sections 69 of the supporting frame are carried through the machine to carry the corresponding end of the object through the buffing field. One single vane wheel could be constructed to control all the movements of the beams, but this wheel would have to be exceedingly large, and therefore two vane wheels are used, as described, wheel 13 controlling the rack bar and the beams during buffing of one bend of the object and wheel 11 controlling the rack bar and the beams during buffing of the other bend of the object. After vane wheel 13 has controlled the rack bar the rack bar is shifted to a neutral position by the cam 8 and then into association with the wheel 11. When the machine is reversed vane wheel 11 first controls and then wheel 13 assumes control.

I shall now trace through the machine a complete buffing operation. Normally the machine is at rest with all the parts disposed as shown in the drawings. Belts 32 and 33 are on the loose pulleys, the cam roller 147 being against the cam edge 148 of cam plate 149 on wheel 8 (Figs. 9, 10 and 11). Roller 58 on shift bar 55 controlling the rack bar is in the inner section 9$^i$ of the cam wheel 8, the rack bar being in association with vane wheel 13 and the beams being slightly inclined toward the machine from the vertical, as shown in Figs. 3, 4 and 6, the object-supporting frame being in the position indicated with the ends of sections 70 between its driving pinions and guide rollers. The object 0 has been inserted in the machine, as shown in Fig. 7, the lower end of the object being without the buffing plane of the buffing wheels and the motor frames being swung by the energized electro-magnets to spread the buffers apart, the electro-magnet circuit being closed as the roller 211 is engaged by the cam plate 206 on wheel 8. The notch 168 of disk 167 is receiving the roller 161 and cam roller 158 is raised above the path of cam plate 149, and the worm shaft driving belt has connection with the idler pulley 127. Abutment 191 is in engagement with roller 190 and the brake strap is held to the brake pulley. To start the machine shift bar 34 is pulled out to carry belt 32 to the pulley 31 and the machine starts in a forward direction. Pinion 35 will rotate gear 12 which controls the vane wheels, and pinions 36 and 37 will rotate gears 14 and 21 respectively which results in rotation of gears 16 and 23 and the pinions 19 and 26 engaged thereby whereupon the side members 67$^l$ and 67$^r$ will be driven to carry the object-supporting frame inwardly. Through gears 38, 39 and 42 gear 10 on cam wheel 8 is rotated and as soon as cam block 212 on cam plate 206 (Fig. 9) strikes tooth 203 of the switch mechanism the switch bar is released and thrown upwardly to open the electro-magnet circuit to allow the springs 106 to become effective to swing the motor frames to carry the buffing wheels together, this happening as soon as the lower end of the object reaches the buffing wheels, and buffing of the object begins.

While the supporting frame moves inwardly vanes 224 and 225 on vane wheel 13 coöperate with the rack bar to raise the rack bar a sufficient distance to cause the beams to swing to a vertical position and to receive the lower rollers 223 on the supporting frame in the beam grooves 221, and when this position is reached the bends 72 of the side members 67$^l$ and 67$^r$ have reached the pinions 19 and 26, the supporting frame being then ready to be swung from a vertical to a horizontal position. At this time, however, vanes 226 on wheel 13 have come into association with the rack bar and the rack bar is raised to rotate the beam supporting gears 15 and 22 by means of rack pinion 124, and the pinions 45 and 46 mounted on shaft 43, the beams coöperating with the pinions 19 and 26 to swing the supporting frame into vertical position. When this has been accomplished the circular part of vane 227 comes into association with the rack bar and during this association roller 58 on shift bar 55 passes into the middle section 9$^m$ of the groove on cam wheel 8, and the rack bar is shifted to its middle or neutral position away from the vane wheels, and during this position the pinions 19 and 26 act along the sections 68 of the supporting frame to carry the frame horizontally through the machine, rollers 222 and 223 of the frame passing along grooves 220 and 222 of the horizontally disposed beams to thus guide the supporting frame, this continuing until bends 71 of the supporting frame reach the pinions 19 and 26. Just before this position is reached the shift bar roller 58 will be carried into the outer section 9° of the cam wheel 8 to bring the radial section of vane 228 on wheel 11 into association with roller 60 on the rack bar and immediately thereafter vanes 229 coöperate with rollers 60 to move the rack bar still farther downwardly which results in movement of the beams to a vertical position at the front side of the machine, the supporting frame being then also in vertical position at the front side of the machine. Pinions 19 and 26 now act on the sections 69 of members 67¹ and 67ʳ to move the supporting frame outwardly, during which time the corresponding end of the object is buffed and during this movement the beams are drawn to an inclined position to guide the upper part of the frame outwardly, the vane 230 during this time coöperating with the rack bar. During this transit of the supporting frame through the machine the large cam wheel 8 was rotated in counter-clockwise direction and as soon as the end of the object leaves the buffing wheels cam block 184 on cam wheel 8 strikes cam roller 183 on lever 181 which results in inward shifting of the slider frame 141, thus causing belt 32 to be shifted to idle pulley 30 and reverse belt 33 to be shifted to driving pulley 31 whereupon the machine operates in reverse direction, the cam wheel 8 then rotating in clock-wise direction. The vane wheels and the gears 14 and 21 now rotate in the opposite direction and the supporting frame carried back through the machine to its normal position, the various cam vanes acting in opposite direction on the rack bar to cause the beams to travel back to their normal position indicated in Figs. 4 and 6. When the slider frame 141 was initially pulled outwardly to start the machine arm 171 was rotated to carry pawl 172 over the ratchet wheel 170, and when the frame 141 was shifted inwardly to reverse the machine the pawl arm was rotated in reverse direction and the ratchet wheel advanced to carry the notch 168 from roller 161, this causing bar 157 to be lowered and cam roller 158 brought into the path of the cam plate 149 on wheel 8. As the wheel 8 now approaches the end of its clockwise rotation roller 158 will engage the approach surface 150 and will be carried to the edge 148 of cam block 149, thus causing outward shifting of bar 157 and shifting of belt 128 from the loose to the driving worm shaft pulley 126 and the worm shaft is rotated to cause rotation of the worm wheel 121. The engagement of roller 158 with the cam plate 149 occurs immediately after the buffing wheels leave the end of the object and rotation of the worm wheel continues so long as roller 158 remains on cam plate surface 148. When the roller again leaves the cam plate spring 155 will shift back frame 157 to return the belt to the idle worm shaft pulley. At the same time when the end of the object is moved away from the buffing wheels the cam plate 206 on wheel 8 engages roller 211 of the switch mechanism and causes the switch bar to be carried down to close the circuit through the electro-magnets 106 which become energized to swing the motor bodies and to spread apart the buffing wheels in order to prevent wearing away of supporting arm 83 to whose end the object is secured. At the end of this clockwise movement the various parts will again be in the normal position shown on the drawings with the exception that the slider frame 141 is at its innermost position. When this slider frame was shifted inwardly lever 137 was swung rearwardly and the crank arm 131 carried downwardly into the path of the cam blocks 133, 134 on the worm wheel. The duration of rotation of the worm shaft is such that the worm wheel will be rotated 180 degrees, this rotation being transmitted through connecting rod 118 to the rim 88 so that at the end of a buffing cycle the rim is given a rotation such that buffing wheels will engage different longitudinal areas of the object when the object is again moved through the buffing field.

Referring to Fig. 2, the worm wheel rotates in counter-clockwise direction and during this first rotation thereof cam block 134 will engage the roller 132 at the end of arm 131 to cause rotation of shaft 130 and outward movement of connecting rod 136 to swing lever 137 forwardly to thereby shift frame 141 to its outermost position to carry the belts 32 and 33 into engagement respectively with driving pulley 31 and idler pulley 29 whereafter the machine will again operate in forward direction. The motor supporting frame is, therefore, angularly shifted during the time that the end of the object is carried outwardly away from the buffing field and back to the buffing field, and the cam blocks 133, 134 are so situated that they will coöperate with the crank arm 131 after 90 degrees rotation of the worm wheel, or in other words, the belts will be shifted when the supporting frame reaches its outermost position. After the belts have been again shifted to their outermost position the vane wheels and gears 14 and 21 again rotate in forward direction and cam wheel 8 will rotate in counter-clockwise direction and the cycle of operations above traced is repeated. The disk 167 will hold cam roller 158 in the plane of the cam plate 149 until the notch 168 again reaches the roller 164. After the second counter-clockwise rotation lever 181 will be actuated to shift inwardly slider frame 141 to cause reversal of the machine and at the end of the second clockwise rotation of cam wheel 8 roller 158 is engaged to actuate shift frame 157 to cause rotation of the worm shaft through its remaining 180 degrees which results in returning of the rim 88 to its normal position, the electro-magnets being at the same time energized to spread the buffing wheels, as before described. This second rotation of the worm wheel will cause engagement of cam projection 133 with arm 131, and shift frame 141 will be returned to its outer position to connect the belts for forward driving. During each reciprocation of the frame 141 the ratchet wheel and disk will be advanced and as soon as the notch 168 again reaches roller 161 spring 169 will raise bar 157 to lift roller 158 out of the path of cam plate 149, and during the following clockwise rotation of cam wheel 8 roller 158 will not be engaged by cam plate 149 but roller 147 on slider frame 141 will be engaged by the cam plate and slider frame 141 shifted outwardly, but this outward shift by roller 147 will be far enough only to carry belts 32 and 33 to idle pulleys 30 and 29 respectively and the machine therefore stops. The roller 147 is, therefore, effective only to shift the belts to stop the machine when the ratchet mechanism is in position to raise the bar carrying roller 158, this roller 158 controlling the shifting of frame 141 during such time as roller 161 is out of notch 168. At the end of each clock-wise rotation of wheel 8, abutment 190 actuates the brake mechanism.

Heretofore it was necessary to buff and polish by hand curved and bent parts such as the top tubes or bows of bedsteads, requiring a great amount of time and causing beds to be quite expensive. My invention, such as shown and described herein, is, therefore, novel and very useful. All that is necessary is to apply an object to the machine and to start the machine whereafter the machine operates entirely automatically to buff and polish the object and to stop itself after treatment of the object has been completed. As a whole the machine is very simple but very efficient. The object supporting frame is carefully and rigidly supported and guided by the beams controlled by the vane wheel and ratchet mechanism and the object always maintains perfect alinement in the buffing field so that uniform buffing results. The buffing wheels are automatically spread apart after the object leaves their field, so that the machine parts are saved from wear by the buffing wheels, and the wheels are automatically bodily rotated about the buffing field to engage with different areas of the object. The number of transits of the object through the buffing field can be set on the ratchet and disk mechanism whose operation after such setting is entirely automatic.

Many changes and modifications could, of course, be made, and I do not, therefore, wish to be limited to the precise construction, arrangement or operation which I have shown and described, but I desire to secure the following claims by Letters Patent:

1. In a buffing machine, the combination of a buffing member, a motor for driving the buffing member, means for carrying an object to be buffed through the field of the buffing member, and means for automatically causing bodily movement of the driving motor to shift the buffing position of the buffing wheel with respect to the object.

2. In a buffing machine, the combination of a buffing wheel, a motor for carrying and driving the buffing wheel, means for moving an object to be buffed back and forth through the field of the buffing wheel, means for moving the motor frame to withdraw the buffing wheel from the object when the ends of the object are reached, and means for moving the motor to carry the buffing wheel about the object to engage another area of the object.

3. In a buffing machine, the combination of a driving motor, a buffing wheel supported and driven by the driving motor, supporting mechanism for carrying a comparatively long object lengthwise back and forth through the buffing field of the buffing wheel, and means for causing bodily movement of the motor at predetermined intervals to carry the buffing wheel from one buffing area to another of the object.

4. In a buffing machine, the combination of a driving motor, a buffing wheel supported and driven by the driving motor, supporting mechanism for carrying a comparatively long object lengthwise back and forth through the buffing field of the buffing wheel, and means for periodically moving said motor to remove the buffing wheel from the object.

5. In a buffing machine, the combination of a driving motor comprising a frame and operative parts supported thereby, a buffing wheel carried and driven by the operative parts, a supporting frame for carrying comparatively long objects to be buffed longitudinally back and forth through the buffing field of the buffing wheel, means for periodically moving the motor frame to carry the buffing wheel away from the object, and means for periodically causing movement of the motor frame to shift the buffing position of the buffing wheel with reference to the object.

6. In a buffing machine, the combination of a supporting frame for supporting a comparatively long object having longitudinal bends, buffing mechanism forming a buffing field, and driving means for said supporting frame for causing said frame to carry the object through the buffing field and to swing the object when the bends thereof pass through the buffing field.

7. In a buffing machine, the combination of a supporting frame for supporting a comparatively long object having longitudinal bends, buffing mechanism forming a buffing plane, and driving mechanism for said supporting frame for causing movement thereof to carry the object through the buffing plane and to maintain the longitudinal axis of the object at right angles with the buffing plane when passing therethrough.

8. In a buffing machine, the combination of a supporting frame for supporting at its end a comparatively long object having longitudinal bends, buffing mechanism forming a buffing plane, and driving mechanism for the supporting frame for causing said frame to carry the object back and forth through the buffing plane and to cause bodily swinging of the object in accordance with its bends to maintain the longitudinal axis of the object at a constant angle with the buffing plane when passing therethrough.

9. In a buffing machine, the combination of a supporting frame for supporting the ends of a comparatively long object having longitudinal bends, a plurality of buffing wheels grouped to form a buffing field, driving means for the supporting frame for causing said frame to carry the object longitudinally back and forth through the buffing field and for bodily swinging said object in accordance with its bends when said bends are passing through the buffing field, and means for periodically bodily shifting said buffing wheels to cause different areas of the object to be engaged thereby.

10. In a buffing machine, the combination of a supporting frame for supporting a comparatively long object having longitudinal bends, a driving gear rack for the supporting frame having the same longitudinal shape as the object, a buffing wheel, and means for driving said rack to cause the supporting frame to carry the object through the field of the buffing wheel.

11. In a buffing machine, the combination of a supporting frame for supporting a comparatively long object having longitudinal bends, a gear rack on said supporting frame having the same longitudinal shape as the object, a buffing wheel, a driving pinion coöperating with the pinion to cause the rack to carry the object through the field of the buffing wheel, and drive mechanism coöperating with the pinion to cause the rack to be swung in accordance with the bends of the object when said bends are passing through the buffing field.

12. In a buffing machine, the combination of a supporting frame for supporting a comparatively long object having longitudinal curvature, a buffing wheel, gear mechanism for driving said supporting frame to carry the object through the buffing field, auxiliary controlling mechanism for said frame, and cam mechanism for controlling the operation of said auxiliary mechanism to bodily swing said frame in accordance with the curvature of the object when the curved part of the object is passing through the buffing field.

13. In a buffing machine, the combination of a supporting frame for supporting a comparatively long object having longitudinal bends, a stationary buffing wheel, a gear rack on said supporting frame having the same longitudinal shape as the object, a driving pinion coöperating with said gear rack to drive the frame to carry the object through the buffing field from one object end to the other, auxiliary controlling mechanism for the frame, and cam driving mechanism for said auxiliary mechanism for causing said auxiliary mechanism to bodily swing the frame in accordance with the bends of the object when said bends are being carried through the buffing field whereby the object is uniformly buffed by the buffing wheel along its entire length.

14. In a buffing machine, the combination of a carrier for supporting an object to be buffed, a plurality of driving motors, a buffing wheel supported and driven by each motor, a frame for supporting said motors, said motors being arranged on said frame to group the buffing wheels to form a buffing field for receiving the object, means for driving the carrier frame to carry the object back and forth through the buffing field, and means for periodically moving the motor supporting frame with the motors to cause shifting of the buffing wheels with reference to the object whereby different areas of the object are engaged by the buffing wheels.

15. In a buffing machine, the combination of a carrier for supporting an object to be buffed, a plurality of driving motors, a buffing wheel supported and driven by each motor, a frame for supporting said motors, said motors being arranged on said frame to group the buffing wheels to form a buffing field for receiving the object, means for driving the carrier frame to carry the object back and forth through the buffing field, means for periodically moving the motor supporting frame with the motors to cause shifting of the buffing wheels with reference to the object whereby different areas of the object are engaged by the buffing wheels, and means for periodically moving the motors to carry the buffing wheels from buffing engagement with the object.

16. In a buffing machine, the combination of a carrier frame for supporting an object to be buffed, a supporting frame, a motor mounted on said frame, a buffing wheel carried and driven by the motor, means for driving the carrier frame to carry the object back and forth through the field of the buffing wheel from one end of the object to the other, means for swinging the motor to carry the buffing wheel from the buffing plane with reference to the object when the object reaches one end of its passage through the buffing field, and means for rotating the supporting frame and the motor thereon when the buffing wheel is out of the buffing plane whereby the buffing wheel will engage another area of the object when applied to the object during the succeeding passage through the buffing field.

17. In a buffing machine, the combination of a carrier frame for supporting an object to be buffed, a driving motor, a buffing wheel carried and driven by the driving motor, means for driving the carrier frame to carry the object through the field of the buffing wheel, and electro-magnetic means for periodically moving the motor to periodically carry the buffing wheel from buffing engagement with the object.

18. In a buffing machine, the combination of a carrier frame for supporting an object to be buffed, a motor pivoted to swing bodily, a buffing wheel carried and driven by said motor, means for driving the carrier frame to carry the object through the field of the buffing wheel from one end of the object to the other, and electro-magnetic means for swinging the motor when the ends of the object have passed through the buffing field to thereby move the buffing wheel away from the buffing plane of the object.

19. In a buffing machine, the combination of a carrier frame for supporting an object to be buffed, a motor pivoted to swing bodily, a buffing wheel carried and driven by said motor, means for driving the carrier frame to carry the object through the field of the buffing wheel from one end of the object to the other, electro-magnetic means for swinging the motor when the ends of the object have passed through the buffing field to thereby move the buffing wheel away from the buffing plane of the object, and means for bodily moving the motor to carry the buffing wheel into a different plane whereby said buffing wheel will engage a different buffing area when again applied to the object.

20. In a buffing machine, the combination of a carrier frame for supporting an object to be buffed, a rotatable supporting frame, a plurality of motors mounted on said supporting frame, a buffing wheel carried and driven by each motor, said motors being arranged on said supporting frame to group the buffing wheels about the axis of said supporting frame to form a buffing field, driving means for said carrier frame for causing forward and reverse bodily movement thereof to carry the object forward and back through the buffing field, additional driving means for controlling the rotation of said motor supporting frame to shift the positions of said buffing wheels in the buffing field, cam mechanism coöperating with the carrier frame driving mechanism to control the forward driving of said driving mechanism, and cam mechanism associated with the motor supporting frame driving mechanism to control the reverse driving of said carrier frame driving mechanism.

21. In a buffing machine, the combination of a carrier for supporting an object to be buffed, a rotatable supporting frame, a plurality of motors carried on said frame, a buffing wheel carried and driven by each motor, said motors being arranged on said frame to group the buffing wheels about the frame axis to form a buffing field, reversible driving mechanism for the carrier for causing said carrier to carry the object back and forth through the buffing field, clutch mechanism for controlling the connection of said driving mechanism with a driving source, additional driving mechanism for controlling the rotation of the motor supporting frame, clutch controlling mechanism associated with the carrier driving mechanism to control the connection of said driving mechanism with the source for forward operation, and additional clutch mechanism associated with the motor frame driving mechanism to control said clutch mechanism to connect said carrier driving mechanism with the source for reverse operation of said carrier driving mechanism.

22. In a buffing machine, the combination of a carrier for carrying an object to be buffed, a rotatable supporting frame, a motor carried on said frame, a buffing wheel carried and driven by said motor, reversible driving mechanism for controlling said carrier to carry the object back and forth through the buffing field, additional driving mechanism for controlling the rotation of said motor supporting frame, mechanism controlled by the carrier driving mechanism for adjusting said driving mechanism for forward operation, and mechanism controlled by said motor frame driving mechanism for adjusting said carrier driving mechanism for reverse operation.

23. In a buffing machine, the combination of a carrier for carrying an object to be buffed, a rotatable supporting frame, a motor carried on said frame, a buffing wheel carried and driven by said motor, reversible driving mechanism for controlling said carrier to carry the object back and forth through the buffing field, additional driving mechanism for controlling the rotation of said motor supporting frame, mechanism controlled by the carrier driving mechanism for adjusting said driving mechanism for forward operation, mechanism controlled by said motor frame driving mechanism for adjusting said carrier driving mechanism for reverse operation, and means associated with the carrier driving mechanism for controlling the operation of the motor supporting frame driving mechanism.

24. In a buffing machine, the combination of a carrier for carrying an object to be buffed, a rotatable supporting frame, a motor carried on said frame, a buffing wheel carried and driven by said motor, reversible driving mechanism for controlling said carrier to carry the object back and forth through the buffing field, additional driving mechanism for controlling the rotation of said motor supporting frame, mechanism controlled by the carrier driving mechanism for adjusting said driving mechanism for forward operation, mechanism controlled by said motor frame driving mechanism for adjusting said carrier driving mechanism for reverse operation, and means for automatically stopping both driving mechanisms after a predetermined number of passages of the object through the buffing field.

25. In a buffing machine, the combination of a carrier frame for supporting a comparatively long object having two longitudinal bends, gear racks on said frame having the same longitudinal shape as the object, buffing wheels forming a buffing field, driving pinions coöperating with said racks to move the frame to carry the object through the buffing field, auxiliary controlling means for said frame for bodily swinging said frame in accordance with the curvature of the object bends when said bends are being carried through the buffing field, and two driving cams for said auxiliary controlling mechanism, one of said cams controlling said auxiliary mechanism during the passage of one bend through the buffing field and said other cam controlling said auxiliary mechanism during passage of the other bend through the buffing field.

26. In a buffing machine, the combination of a carrier frame for carrying a comparatively long object having longitudinal bends, buffing mechanism forming a buffing field, driving mechanism for driving said frame to carry the object through said buffing field, auxiliary controlling means associated with said frame to cause bodily swinging of said frame in accordance with the curvature of the bends of the object when said bends are passing through the buffing field, driving mechanism for said auxiliary controlling mechanism, and cam mechanism for automatically controlling the connection of said driving mechanism with said auxiliary mechanism.

27. In a buffing machine, the combination of a carrier frame for supporting objects having bends, buffing mechanism forming a buffing field, a supporting frame for the carrier, means for driving said supporting frame to bodily move the carrier in accordance with the bends of the object, and means for driving the carrier frame to cause the object thereon to be drawn longitudinally through the buffing field.

28. In a buffing machine, the combination of a carrier frame for supporting a comparatively long object having longitudinal bends, a gear rack on said carrier frame having the same longitudinal shape as the object, buffing mechanism forming a buffing field, a driving pinion meshing with said gear rack, means for driving said pinion, said pinion when driven tending to cause longitudinal travel of the gear rack to cause the object to be carried longitudinally through the buffing field, a swinging supporting frame for said carrier frame, and means for swinging said frame when the bends of the gear rack engage with the driving pinion to swing the gear rack in accordance with the bends thereby to assist the driving pinion in causing longitudinal travel of the gear rack.

29. In a buffing machine, the combination of a carrier frame for supporting a comparatively long object having a longitudinal bend, buffing mechanism forming a buffing field, driving means for driving said frame to draw the object longitudinally through said buffing field, a swinging frame, a cam rack controlling the swing of said supporting frame, and a cam wheel coöperating with said cam rack to cause swing of said supporting frame to swing the object in accordance with the bend thereof thereby to assist in drawing said object longitudinally through the buffing field.

30. In a buffing machine, the combination of a carrier frame for supporting an object having a longitudinal bend, buffing mechanism forming a buffing field for said object, means for positively actuating said carrier frame to draw the object longitudinally through the buffing field, a supporting frame associated with said carrier frame and adapted to swing said carrier frame in accordance with the bend of the object to thereby assist said carrier frame in drawing the object longitudinally through the buffing field, a reciprocating cam rack, a continuously driven cam wheel, transmission mechanism between said cam rack and supporting frame, and cam surfaces on said cam wheel arranged to coöperate with said cam rack to cause actuation of the supporting frame when the bend of the object is passing through the buffing field.

31. In a buffing machine, the combination of buffing mechanism forming a buffing field, a carrier frame for supporting a comparatively long object having longitudinal bends, means for positively actuating said carrier frame to draw said object longitudinally through the buffing field, a swinging supporting frame adapted to be associated with the carrier frame to cause swing of the carrier frame in accordance with the bends thereto to thereby assist the longitudinal passage of the object through the buffing field, a cam rack having driving connection with said supporting frame, a plurality of continuously driven cam wheels each having cam surfaces adapted to engage with the cam rack to actuate the swinging supporting frame when one of the object bends is passing through the buffing field, and means automatically controlled to shift the cam rack from one cam wheel to the other.

In witness hereof, I hereunto subscribe my name this 11th day of November A. D. 1909.

JOHN F. GAIL.

Witnesses:
J. H. CANTWELL, Jr.,
GUS JACOB.